July 25, 1967  G. BRADFIELD  3,332,506

SENSITIVE WEIGHING APPARATUS

Filed July 6, 1965  4 Sheets-Sheet 2

Inventor
Geoffrey Bradfield
By Cushman, Darby & Cushman
Attorneys

July 25, 1967  G. BRADFIELD  3,332,506
SENSITIVE WEIGHING APPARATUS
Filed July 6, 1965  4 Sheets-Sheet 3

United States Patent Office 3,332,506
Patented July 25, 1967

3,332,506
SENSITIVE WEIGHING APPARATUS
Geoffrey Bradfield, Walton-on-the-Naze, Essex, England, assignor to National Research Development Corporation, London, England, a body corporate
Filed July 6, 1965, Ser. No. 469,736
11 Claims. (Cl. 177—210)

ABSTRACT OF THE DISCLOSURE

A force measuring device suitable for weighing small masses to high accuracy comprises two parallel beams of crystal material such as quartz or synthetic sapphire each cut from a single crystal, the force being applied through mid-points of the two beams. Their surfaces facing one another are metallized so that they constitute capacitors, the capacitance of which is varied by the forces and is used in a circuit to vary the frequency of a signal, this variation constituting a measure of the deflection and hence of the force. Alternatively inductors may be varied by the deflection, the measurement being similarly made. The two beams may be integral with end pieces or be made separately. A double arrangement may be used disposed so that one gap increases as the other gap decreases when the force is applied. The law of the device is not strictly linear and correction can be applied by a computer circuit which counts beat frequency oscillations obtained by comparing signal frequency with a fixed frequency and applies correction during the count.

---

Figure 1:
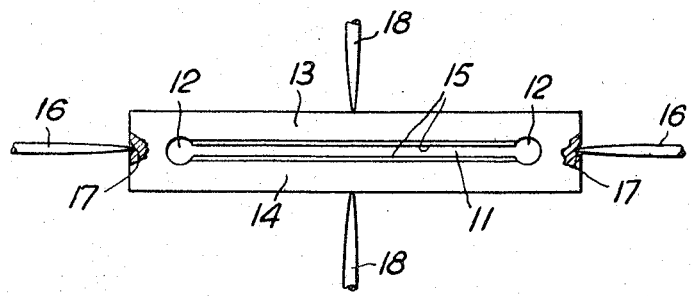

This invention relates to apparatus for the measurement of forces and has for an object the provision of an apparatus which is capable of measuring small forces to a high accuracy. A particular object in view is the weighing of small masses, for example masses of up to 100 grams to an accuracy of one part in a million.

The invention is based on the principle of the spring balance, that is to say the force to be measured is applied to stressing a spring and the resultant deflection constitutes a measure of the force. Achievement of the accuracy aimed at presents serious problems however. Two principal problems are, one to ensure that the same force always produces the same deflection and a return to the same zero position, and the other to measure the deflection to a sufficient accuracy. There are other problems of a subsidiary character which will be mentioned later.

To deal with the first problem, the invention employs a spring cut from a single crystal. This greatly reduces hysteresis, a principal cause of variation in deflection and zero position. To deal with the second problem the deflection of the spring is employed to vary a reactive electrical impedance and this variation is evaluated by electrical means. Measurement in this way is not only capable of high accuracy, but as will be shown lends itself to digital measurement and to compensation for the non-linearity in the relationship between the force, and the change in the value of the impedance involved by preferred forms of the crystal spring and the impedance.

An important subsidiary problem is the avoidance of external reactions or friction which would prevent the whole of the force to be measured from being applied to deflecting the crystal. To deal with this a floating arrangement is used, the crystal spring itself being supported at neutral zones, that is zones which are not deflected with respect to the spring centre by the applied force, while the force and the reaction are directly applied to the crystal spring.

Another important subsidiary problem is presented by temperature effects. It would be possible, but hardly practicable, to enclose the whole apparatus in a constant temperature chamber, but it is preferred to select the orientation at which the crystal spring is cut to give a temperature coefficient of elasticity which is either zero, or has a value which can be compensated by or will compensate for the effects of the temperature coefficients of the components of the electric measuring means.

The reactive impedance may be inductance, in which case the crystal spring may carry one or more ferrite cores associated with coils, when the movement of the cores as the crystal deflects will produce a change in the inductance of the coils. Alternatively and preferably the reactive impedance is capacitance, for which purpose an electrode coating a surface of the crystal which is moved as it deflects has another electrode juxtaposed to it to constitute a variable capacitor.

A circuit such as a bridge circuit may be used to measure the change in the variable impedance, but it is preferred to use this impedance in an oscillatory circuit the frequency of which is varied by the change in the impedance, the frequency then constituting a measure of the deflection and hence of the force being measured. A development conssits in providing two oscillatory circuits which at zero deflection have the same frequency. Then the beat frequency when a force is applied provides a measure of the force. The second circuit may be a constant frequency circuit, or both may incorporate a variable impedance, the deflection of the crystal causing the value of the variable impedance in the one circuit to be increased and in the other to be decreased, thus increasing the sensitivity. By counting the beats over a predetermined interval a digital measure of the force is obtained and by providing a compensating circuit which injects pulses into the counting circuit, compensation can be obtained for non-linearity in the relationship between beat frequency and force.

Suitable materials for the crystal spring are synthetic sapphire and quartz both of which can be obtained with a very regular crystal lattice so that hysteresis is effectively zero and the physical properties are extremely stable giving long term accuracy. If the crystal spring is of quartz and frequency variation is used as a measure of the force, the crystal itself may be used to control the frequency at zero deflection. It has previously been observed that mechanical loading of a crystal so used will vary the frequency and it has been proposed to make use of this to measure the value of the force. The sensitivity in that case is however lower than contemplated here and it should be emphasised that where the present invention employs a quartz crystal spring to control the zero-deflection frequency of a measuring circuit, it is the variation in a reactive impedance controlled by the deflection of the crystal which produces the variation in frequency; the direct variation produced by the mechanical loading of the crystal spring is minute compared with that caused by the variation in the reactive impedance and thus is not made use of here.

Figure 2:
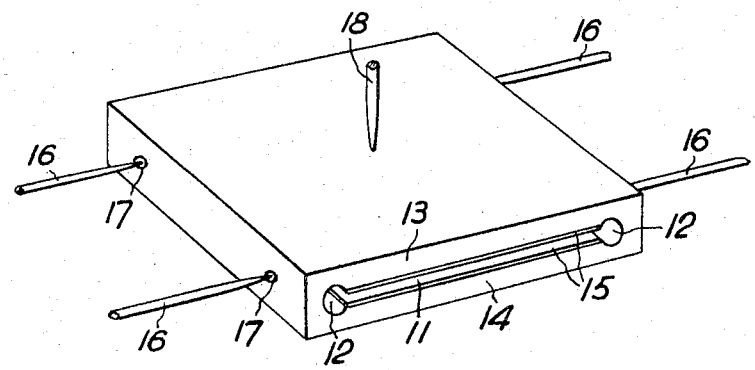
Figure 3:
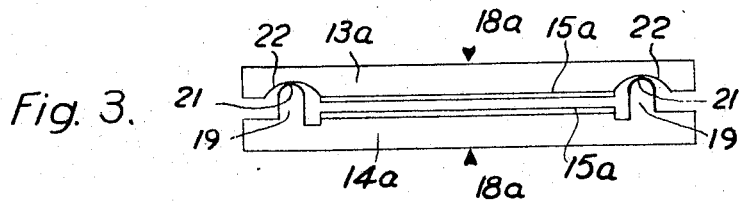
Figure 4:
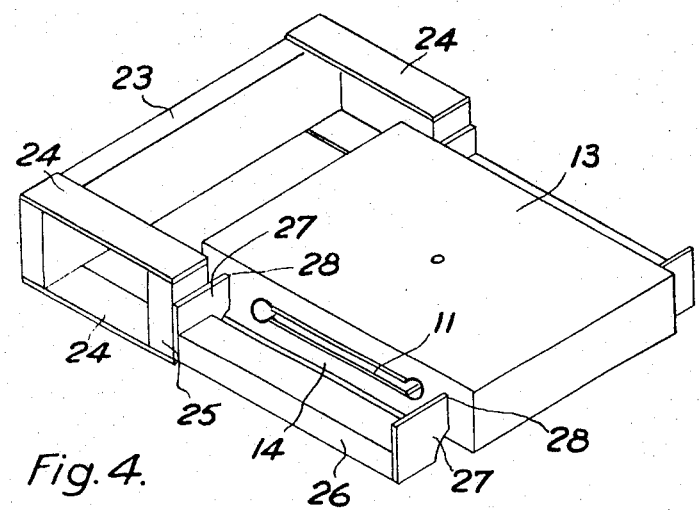
Figure 5:
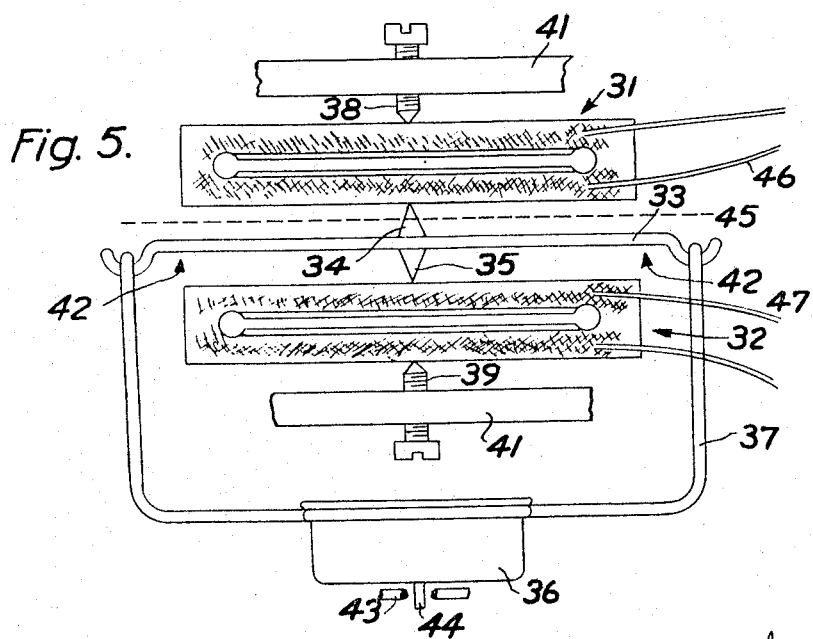
Figure 6:
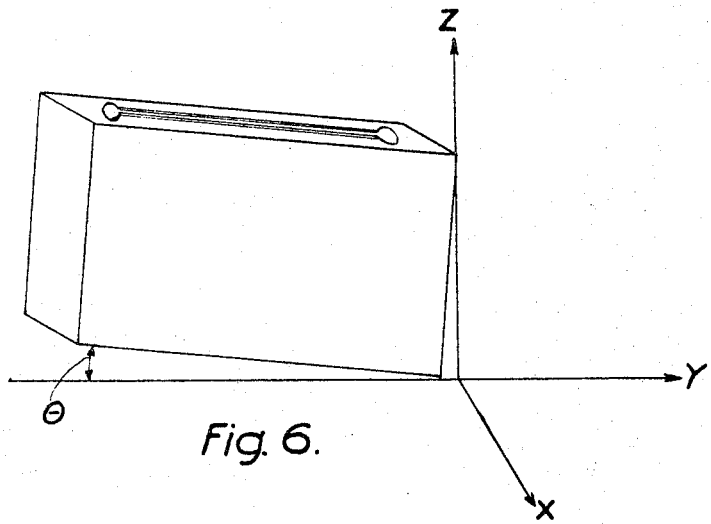
Figure 7:
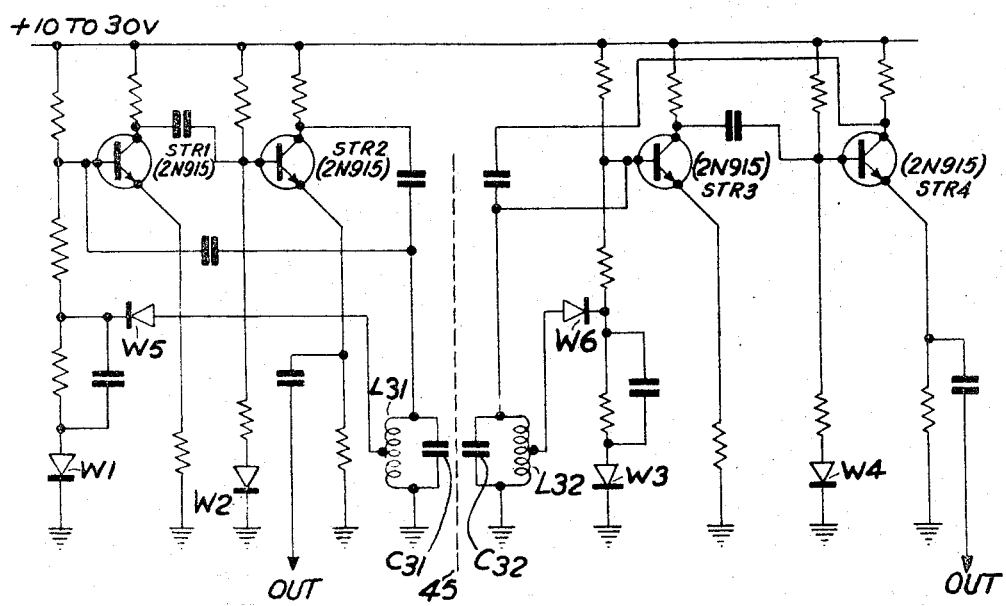
Figure 8:
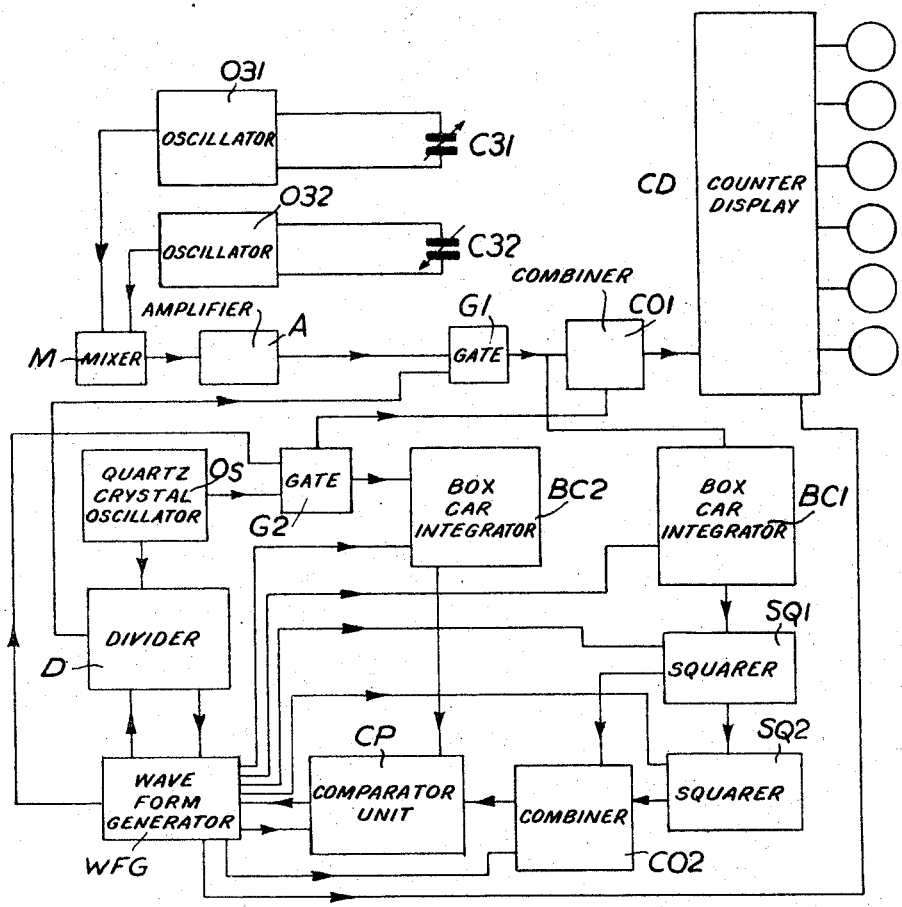

The invention will be further described with reference to the accompanying diagrammatic drawings in which
FIGURE 1 is a side view and
FIGURE 2 a perspective view of one form of crystal spring which can be used, together with the means for supporting it and applying the load to be measured,
FIGURE 3 is a side view of another construction of crystal spring which may be used,
FIGURE 4 is a perspective view of another and preferred mode of mounting the crystal spring,
FIGURE 5 is a side view of a weighing device according to the invention, employing two crystal springs, oppositely deflected by the weight to be evaluated, FIGURE 6 is a diagram showing how the crystal spring may be cut to obtain zero or a desired low temperature coefficient, FIGURE 7 is a diagram of a circuit which may be used in conjunction with the device of FIGURE 5, and FIGURE 8 is a block diagram of a circuit giving a digital reading of the measured mass and providing for compensation for the lack of linearity of a circuit which only counts beats of a beat frequency.

The crystal shown in FIGURES 1 and 2 may be conveniently of α quartz cut in an orientation for the desired temperature coefficient of elasticity. The crystal is in the form of a rectangular block in which a thin air gap is provided by drilling a pair of holes at 12 and joining these by a slot, thus converting the block into a pair of parallel beams 13, 14 integrally united at their ends. The holes at 12 and the slot 11 may conveniently be cut, and the surfaces formed be polished, by ultrasonic means.

The top and bottom faces of the gap 11 are coated with conductive metallizing 15, conveniently of silver or fired "liquid gold" paint. The crystal is supported by positioning needles 16, conveniently of polished sapphire engaging in depressions 17 in the neutral bending plane of the ends of the crystal.

Force is applied to the crystal to deform it and produces a change in capacity by means of force applicators 18 which are conveniently of polished sapphire or polished α-quartz of a similar cut to the plates of FIGURES 1 and 2 with respect to the tangent plane at the point of contact, and which bear upon the centre of the top and bottom faces. Conveniently the force to be measured is applied equally through each of the applicators 18. Preferably the Poisson's ratio of the materials for the force applicators and the crystal should be equal in the plane normal to the line of thrust.

FIGURE 3 illustrates an alternative construction to that shown in FIGURES 1 and 2 but which reacts to the applied forces in a substantially similar fashion while avoiding the difficulty of cutting the slot 11. Here two separate pieces of the crystal material (cut with such an orientation that they are effectively from one block of single crystal) constitute two beams 13a, 14a analogous to those of FIGURES 1 and 2 but instead of being integrally united at their ends, the beam 14a has integral abutments 19 at its ends with rounded upper surfaces 21 and the beam 13a has corresponding rounded surfaces 22, which abut on the surfaces 21. To minimize hysteresis these surfaces 21, 22 are shaped and positioned so that when the beams are deflected under load (applied at 18a) only rolling contact takes place, i.e. there need be little or no tangential force. It is also essential that the entry of any dirt or liquid to the contact region should be avoided. As in FIGURES 1 and 2 the top and bottom faces of the gap 11a between the beams 13a, 14a are metallized at 15a.

Since this construction provides beams freely supported at the ends while those of FIGURES 1 and 2 are fixed ended, for the same dimensions of the beams, this construction undergoes a larger deflection than that of FIGURES 1 and 2 for the same applied force and is to that extent more sensitive.

Since the deflecting force is intended to be applied equally and oppositely to the crystal, it is important that the mounting should not interfere with the desired action, but it must at the same time locate the crystal in other directions. An alternative arrangement to that of the needles 16 of FIGURES 1 and 2 is shown in FIGURE 4. The crystal itself is as in FIGURES 1 and 2 and the same references have therefore been applied to it.

A main bar 23 is part of the fixed structure of the apparatus, the rest of which is not shown. At each end it carries a pair of horizontal parallel leaf springs 24 which at the outer ends carry a block 25 which is thus free to move vertically against the elastic restraint of the springs 24 but is very firmly restrained from moving in any direction in the horizontal plane. To each block 25 are secured, by the aid of a bar 26, two members 27 terminating in vertical knife edges 28 which engage in corresponding slight recesses in the crystal, these recesses being located in neutral planes of the crystal. In this way, by suitable orientation of the bar 23, the crystal is held with the beams 13, 14 and gap 11 horizontal. It is free to "float" vertically under the elastic restraint of the springs 24, but is restrained in all directions in the horizontal plane. The springs 24 should be of a metal with a low or zero temperature coefficient of compliance, for example the alloy known as Ni-Span-C, and should themselves have a stiffness which is only a small fraction, preferably 1 percent at most, of the stiffness of the crystal.

If only a single crystal is used, the load may act directly on one beam, while the fixed structure of the apparatus applies a reaction at the other. In that case the ends of the crystal will be displaced by half the total deflection and this is the movement which would have to be accommodated by the springs 24 if the crystal is supported as in FIGURE 4.

It is preferred however, not only because even this small movement is reduced but because of other and more considerable advantages which will be pointed out, to use two crystals which are oppositely deflected by the force to be evaluated and a desirable arrangement is that shown in FIGURE 5.

Here there are two identical crystals (each as in FIGURES 1 and 2) indicated generally by the references 31, 32. They are mounted as in FIGURE 4, with a separate mounting for each crystal, but the mountings are not shown in the figure to avoid unnecessary complication. Between the crystals is a beam 33 through which the vertical load to be evaluated is applied, and which carries opposed truncated cones 34, 35 with spherical end surfaces which engage the central recesses in the undersurface of the crystal 31 and the upper surface of the crystal 32 respectively. In this example it is assumed that the apparatus is to be used for weighing and accordingly a scale pan 36 is suspended by stirrups 37 from the ends of the beam 33, the parts being proportioned so that the load is vertically below the cones 34, 35, and no tipping forces arise. The assembly is completed by adjustable screws 38, 39 in the fixed structure indicated at 41, which engage the central recesses in the upper surface of the crystal 31 and the undersurface of the crystal 32 respectively. These screws are adjusted to impose an initial deflection on the crystal 31 greater than that which would be produced by the largest mass to be weighed plus the weight of the parts 33 to 37 and since the mountings provide for vertical float of the crystals, a similar deflection is necessarily imposed on the crystal 32. Beyond this the screws enable at least a partial compensation to be effected for local variations in gravitational force.

For safety's sake stops are provided at 42 to limit the movement of the beam 33 and an annular stop 43 below the bar 36 which surrounds with small clearance (say 0.010 inch) a pin 44 projecting downwardly from the pan.

It will be seen that if a weight is placed in the pan 36 the deflection of the lower crystal will be increased and that of the upper crystal will be decreased by the same amount. By using the respective resulting variations in reactance in a bridge or similar circuit, increased sensitivity is obtained, and, as will be shown, easier correction for non-linearity is obtained. When the two variations are thus to be used, an electrostatic screen indicated by the doted line 45 is provided between the crystals and this may be supplemented by extra metallizing on the crystals in the neighborhood of the connecting wires 46, 47 (which are "near earth potential") leading to the metallizing on the surfaces of the crystal gap nearer the screen 45.

An improved linearity of response is obtained if, in the arrangement of FIGURE 5, the two crystals employed are not initially provided with parallel-sided gaps in the unstressed state, but are brought to this state by adjustment of the screws 38, 39, from an initial state in which the long sides of the gap in each crystal bow outwardly away from each other.

The gaps in the two crystals may, for example, initially both be bowed in the unstressed state to the extent that their gaps are twice as wide at the centre as they are at the ends and then by adjustment of screws 38, 39 the centre gap widths can be reduced to equality with the end gap widths thus causing the gaps to assume parallel-sided form.

An even further improvement in linearity can be obtained if the gaps in the two crystals are unequally bowed. Thus if the centre gap width in the lower crystal 32 is initially greater by $1\frac{1}{2}\Delta$ than the gap width $d$ at the ends of the gap and that of the gap in the upper crystal 31 is initially greater by $\frac{1}{2}\Delta$ than the end gap width $d$ the application of a common compressive force by the screws 38, 39 equal to the maximum load to be measured will stress both crystals to an extent sufficient to reduce their respective centre gap widths by an amount equal to $\Delta$ leaving the centre gap width in the upper crystal 51 equal to $d-\frac{1}{2}\Delta$ and that of the lower crystal 32 equal to $d+\frac{1}{2}\Delta$. Then the application of a pre-loading force equal to one half the maximum load to be measured, and acting in opposite directions on the two crystals, will increase the centre gap width in the upper crystal 31 to equal $d$ and decrease that in the lower crystal 32 to equal $d$ so that both gaps assume parallel-sided form.

Before describing the circuits for evaluating the force from the deflection of the crystals, the mode of cutting the crystal will be described.

In FIGURE 6, the $x$, $y$ and $z$ crystallographic axes of $\alpha$ quartz are shown and the orientation with respect thereto of the slotted block. Calculation from the known elastic coefficients and the corresponding temperature coefficients indicates that for this material, and assuming that the deflection is confined to the rectangular parts of the crystal bounding the slot, the angle $\theta$ should be 9.9° for zero temperature coefficient of elasticity. The minor amounts of compliance contributed by the ends of the crystal can be calculated and with some stress analysis it becomes possible to incorporate them into the scheme for obtaining a zero temperature coefficient of elasticity. The orientation selected may also govern the size and shape of the crystal and the points at which it is supported and loaded. Further it may be desirable to aim for some value of temperature coefficient other than zero to compensate for the temperature frequency coefficient of the oscillatory circuit, and changes in dimensions of the crystal spring.

Since sapphire as well as quartz has a trigonal system, the question of temperature compensation in the case of this material can be approached in the same manner as for $\alpha$-quartz.

The force which deflects the crystal may be evaluated from the following considerations:

The capacitance of the metallizing 15 of the crystal may be written $A/4\pi(d_0-SWg)$. Where A is the area of one metallizing, $d_0$ is the gap 11 when the crystal is unloaded, S is the crystal compliance, and $Wg$ is the force, i.e. the weight W and acceleration due to gravity $g$ in the case of weighing. This formula is an approximation because the crystal is effectively a loaded cantilever spring which when stressed takes a shape at any cross-section with two points of inflection so that the dielectric gap is not constant over the metallizing area. A better approximation can be obtained by substituting for $d_0$ in this formula the mean gap $\frac{1}{2}(d_c+d_0)$ where $d_c$ is the gap width at the centre and $d_0$ the gap width at the ends.

In respect of an oscillatory circuit of which the total capacitance is that above written plus stray capacity, say $C_0$, then if L is the inductance of the circuit and $f$ is the frequency $$2\pi f=[L\{C_0+A/4\pi(d_0-SWg)\}]^{-\frac{1}{2}}$$

Accordingly if $f$ is measured, W (or $Wg$) can be evaluated therefrom, and corrected for the reasons above given.

Frequency is most conveniently measured by comparing the frequency with another frequency and measuring the beat frequency. In the case of a double crystal assembly such as that of FIGURE 5 the frequencies will be those of oscillatory circuits of which the variable capacitances constituted by the crystals form part. A suitable circuit is that shown in FIGURE 7 which comprises a pair of Franklin type oscillators using silicon transistors, type 2N915, STR1, STR2, STR3, and STR4. The tank circuit of each oscillator is made up of capacitance $C_{31}$, $C_{32}$ respectively, being stray capacity plus that formed by the metallizing of the crystal 31 and of the crystal 32 and of inductances $L_{31}$ and $L_{32}$ which are conveniently in the form of metallized threaded quartz formers which may be provided with minute iron dust slug cores. Adjustment of these cores can be used in conjunction with (or instead of) the screw 38, 39 to compensate for local variation in the value of $g$. The circuit includes six silicon diodes of which four, $W_1$, $W_2$, $W_3$ and $W_4$ are connceted in the base circuits of the four transistors STR1 to STR4 and the fifth $W_5$, and the sixth $W_6$ are connected to feedback D.C. to the bases of transistors STR1 and STR4 to stabilize the oscillators under conditions of resonance. All six diodes $W_1$ to $W_6$ also have the effect of introducing a measure of temperature compensation.

Neglecting for the moment stray capacity and the fact that the gap does not remain rectangular under load, for the crystal 31 under load $$2\pi f_{31}=(L_{31}C_{31})^{-\frac{1}{2}}$$
$$=KL_{31}^{-\frac{1}{2}}(d+\delta d)^{-\frac{1}{2}}$$

Where $f_{31}$ is the frequency of the oscillator, K is a constant, $d$ is the unloaded gap in the crystal and $\delta d$ is the deflection.

Similarly for the crystal 32 if its dimensions are the same as those of the crystal 31 so that K is the same for both $$2\pi f_{32}=KL_{32}^{-\frac{1}{2}}(d-\delta d)^{\frac{1}{2}}$$

if now $L_{31}=L_{32}$ the beat frequency, being the difference between $f_{32}$ and $f_{31}$ is proportional to the difference between $(d-\delta d)^{1/2}$ and $(d+\delta d)^{1/2}$. Taking out $d$ and expanding the two expressions in brackets by the binominal theorem, we have $$(1+\delta)^{1/2}=1+\frac{\delta}{2}-\tfrac{1}{8}\delta^2+\tfrac{1}{16}\delta^3-\tfrac{5}{32}\delta^4+\tfrac{7}{64}\delta^5 \cdots$$

and $$(1-\delta)^{1/2}=1-\frac{\delta}{2}-\tfrac{1}{8}\delta^2-\tfrac{1}{16}\delta^3-\tfrac{1}{32}\delta^4-\tfrac{1}{64}\delta^5 \cdots$$

and taking the difference we have $$\delta+\tfrac{1}{8}\delta^3+\tfrac{1}{32}\delta^5+ \ldots$$
or $\delta(1+\tfrac{1}{8}\delta^2+\tfrac{1}{32}\delta^4 \ldots$ (1)

In a practical apparatus the maximum value of $\delta$ will not exceed $\tfrac{1}{10}$ so that the difference of frequency at this maximum value will be $$\delta\left(1+\frac{1}{800}+\frac{1}{320,000}\right)$$

Correction is needed therefore for 1/800 i.e. about $\tfrac{1}{8}$ percent and 1/320,000.

A single crystal could be used in which case the oscillator could be substantially a half of FIGURE 7, the frequency then being measured for example by comparing with a fixed frequency which could be provided by a second oscillator as in FIGURE 6 but with a fixed capacitance, and measuring the beat frequency. There would however not only be the reduction in sensitivity but also a substantial increase in the departure from linearity. Considerations of the above expansions will show that when the difference frequency is taken the alternate terms of the expansions do not disappear and the correction is some 20 times as great.

Reverting now to the circuit of FIGURE 7 a simple analogue computer can be set up with the beat frequency indication and also be arranged to develop the factors $$\tfrac{1}{8}\delta^2 \text{ and } \tfrac{1}{32}\delta^4$$

One convenient arrangement which can be used is shown in block diagram form in FIGURE 8. In this diagram the arrow heads indicate the passage of signals from one unit to another. Oscillators O31 and O32 governed by the crystals 31 and 32 represented by the capacities C31, C32 as above described with reference to FIGURES 6 and 7 feed a mixer M whence the beat frequency feeds an amplifier A and thence via a gate G1 and a combiner CO1, a counter display at CD. The correct scale of this counter is governed by the spring compliance of the crystals 31, 32, by the mean frequency of oscillators O31 and O32, by the frequency of a standard quartz crystal controller oscillator OS say 1 mc./s., and by the dividing ratio of a divider D (which in a typical case may provide a 10 second beat frequency count for display in the counter CD).

The 10 second count is box-car integrated at BC1 and the output is squared at SQ1 and again squared at SQ2 in conformity with Equation 1 above. Additional computer stages of a similar type will be required to cope with the effect of imperfect push-pull matching of the crystals 31, 32 and of stray capacities. These all add appropriately in a combiner CO2 at which the output D.C. voltage is stored for comparison in a comparator unit CP with the output of a box car integrator BC2 supplied from the oscillator OS through a gate G2. This gate has been started into action at the close of the 10 second counter period stored in the counter CD and is feeding 1 mc./s. from the oscillator OS via the combiner CO1 to augment the count in the counter CD. This train of impulses is stopped by the closing of the gate G2 as soon as the computed correction from the combiner CO2 has been compared in unit CP with the output of the integrator BC2 and found to be equal. At this instant the comparator CP sends out via a wave form generator WFG a control pulse to gate G2 to terminate the train of impulses. The waveform generator WFG holds the divider D from opening gate G1 until the expiry of the eleventh second and then permits the whole cycle of events to repeat after waveform generator WFG has sent reset signals to the counter CD, the box-car integrators BC1 and BC2, the squarers SQ1 and SQ2, the comparator CP and the combiner CO2.

What is claimed is:

1. A weighing apparatus comprising a spring cut from a single crystal, means for applying a mechanical force derived from the weight to be measured to stress the crystal spring elastically, means incorporating a reactive electrical impedance the value of which is varied by the deflection of the spring caused by the application of the mechanical force, and electrical evaluating means for evaluating the resulting variation in the value of the impedance and hence the weight to be measured.

2. A weighing apparatus comprising a spring incorporating two parallel bars each cut from a single crystal and held apart at their outer ends to leave a narrow gap between them, means for applying a mechanical force derived from the weight to be measured between the points at mid-length of the two bars and perpendicular to their lengths whereby the bars are loaded in bending towards one another, a reactive electrical impedance varied by the bending of the bars, and electrical evaluating means for evaluating the variation in the value of the impedance.

3. A weighing apparatus as set forth in claim 2 in which the bars are integral with means anchoring their ends together.

4. A weighing apparatus as set forth in claim 2 in which the two bars mutually engage at their ends on surfaces giving pure rolling contact when the bars are deflected by the applied force.

5. An apparatus responsive to changes in a mechanical force comprising a single crystal of elastic material having a slot through it whereby it has the form of two bars with a gap between them but integrally united at their ends, means for applying the force to be measured to the bars thereby to change the gap against the elastic resistance of the bars, an electrically conductive layer on each of the two surfaces of the bars facing one another thereby forming a capacitor, an electric circuit of which the capacitance of said capacitor is an element and which serves to evaluate changes in the capacitance due to changes in the gap between the bars caused by the applied force.

6. An apparatus according to claim 5 in which the mechanical force is applied through a pair of force applicators engaging the mid-points of said bars, the Poisson's ratio of the material of said force applicators and said crystal being equal in the plane normal to the line of thrust of said applicators.

7. An apparatus according to claim 5 in which the mechanical force is applied to the bars at their mid-length and substantially perpendicular to the bars in a sense to reduce the gap.

8. An apparatus according to claim 5 in which the electric circuit is an oscillatory circuit the frequency of which is varied by variation in the capacitance.

9. An apparatus responsive to a mechanical force comprising two assemblies each incorporating two bars of elastic single crystal material and means holding the end portions of the bars spaced apart with the bars substantially parallel and a narrow gap between them, means supporting the two assemblies without imposing any substantial load and with their lengths perpendicular to a common axis, with the axis passing through the mid-point of the length of all four bars, and with one assembly spaced from the other along the axis, means for applying a preliminary compressive force along the axis to the outermost bars, means for applying the force to be measured to the two innermost bars thereby to strain the assemblies elastically in opposite senses, respective reactive impedances varied by the elastic strain of the assemblies so that one is increased and the other decreased by the application of the force to be measured, and an electric circuit of which the two impedances are elements and which evaluates the force from the changes in the impedances.

10. An apparatus as set forth in claim 9 in which the electric circuit comprises two oscillatory circuits of which the respective impedances are elements, and means to cause the respective frequencies to beat together.

11. An apparatus as set forth in claim 10 in which the surfaces of the bars facing the gaps between them are metallized to form respective capacitors which constitute the reactive impedances.

References Cited
UNITED STATES PATENTS

| | | | |
|---|---|---|---|
| 1,431,638 | 10/1922 | Dowling | 177—210 |
| 3,172,493 | 3/1965 | Von Koch et al. | 177—210 |
| 3,281,613 | 10/1966 | Hatschek | 310—8.7 |

RICHARD B. WILKINSON, *Primary Examiner.*

G. H. MILLER, JR., *Assistant Examiner.*